United States Patent
Rueb

(10) Patent No.: US 10,052,734 B2
(45) Date of Patent: Aug. 21, 2018

(54) LASER PROJECTOR WITH FLASH ALIGNMENT

(71) Applicant: VIRTEK VISION INTERNATIONAL ULC, Waterloo (CA)

(72) Inventor: Kurt D. Rueb, Kitchner (CA)

(*) Notice: Subject to any disclaimer, the term of this patent is extended or adjusted under 35 U.S.C. 154(b) by 0 days.

(21) Appl. No.: 15/826,060

(22) Filed: Nov. 29, 2017

(65) Prior Publication Data

US 2018/0104789 A1   Apr. 19, 2018

Related U.S. Application Data

(63) Continuation of application No. 15/784,387, filed on Oct. 16, 2017, and a continuation of application No. 15/784,720, filed on Oct. 16, 2017.

(Continued)

(51) Int. Cl.
| | |
|---|---|
| *G01C 11/04* | (2006.01) |
| *B23Q 17/24* | (2006.01) |
| *G01B 11/00* | (2006.01) |
| *G06T 7/521* | (2017.01) |
| *G01B 11/25* | (2006.01) |
| *G01C 11/02* | (2006.01) |

(Continued)

(52) U.S. Cl.
CPC ..... *B23Q 17/2423* (2013.01); *B23Q 17/2404* (2013.01); *B23Q 17/249* (2013.01); *G01B 11/002* (2013.01); *G01B 11/2513* (2013.01); *G01B 11/2518* (2013.01); *G01C 11/02* (2013.01); *G01C 11/04* (2013.01); *G02B 26/0825* (2013.01); *G02B 26/105* (2013.01); *G06T 7/521* (2017.01); *H04N 9/317* (2013.01); *H04N 9/3129* (2013.01); *H04N 9/3194* (2013.01); *B23Q 2717/00* (2013.01); *G06T 2207/10028* (2013.01); *G06T 2207/10152* (2013.01); *H04N 13/204* (2018.05)

(58) Field of Classification Search
CPC ...... G01C 11/00; G01C 11/02; G01C 15/002; G01C 3/00; G01C 5/00; G01C 9/00; G01C 11/06
See application file for complete search history.

(56) References Cited

U.S. PATENT DOCUMENTS

| | | | |
|---|---|---|---|
| 9,200,899 B2 * | 12/2015 | Rueb | G01C 11/00 |
| 2013/0253682 A1 * | 9/2013 | Rueb | G01C 11/00 700/98 |

(Continued)

*Primary Examiner* — Behrooz Senfi
(74) *Attorney, Agent, or Firm* — Miller Canfield

(57) ABSTRACT

A method for aligning a laser projector for projecting a laser image onto a work surface is provided. The method includes providing a laser projector assembly with a laser source for projecting a laser image onto a work surface, a secondary light source for illuminating the work surface and a photogrammetry device for generating an image of the work surface. The method also includes affixing reflective targets onto the work surface and transmitting light from the secondary light source toward the work surface and reflecting light toward the photogrammetry device. The method further includes scanning the targets with a laser beam generated by the laser source for reflecting the laser beam toward a laser sensor and calculating a location for projecting the laser image onto the work surface from the reflected laser beam.

13 Claims, 2 Drawing Sheets

Related U.S. Application Data

(60) Provisional application No. 62/408,944, filed on Oct. 17, 2016.

(51) Int. Cl.
  *G02B 26/08* (2006.01)
  *G02B 26/10* (2006.01)
  *H04N 9/31* (2006.01)
  *H04N 13/204* (2018.01)

(56) References Cited

U.S. PATENT DOCUMENTS

| | | | |
|---|---|---|---|
| 2014/0210996 A1* | 7/2014 | Rueb | G06T 7/73 348/95 |
| 2016/0091311 A1* | 3/2016 | Rueb | G01C 11/00 348/94 |

* cited by examiner

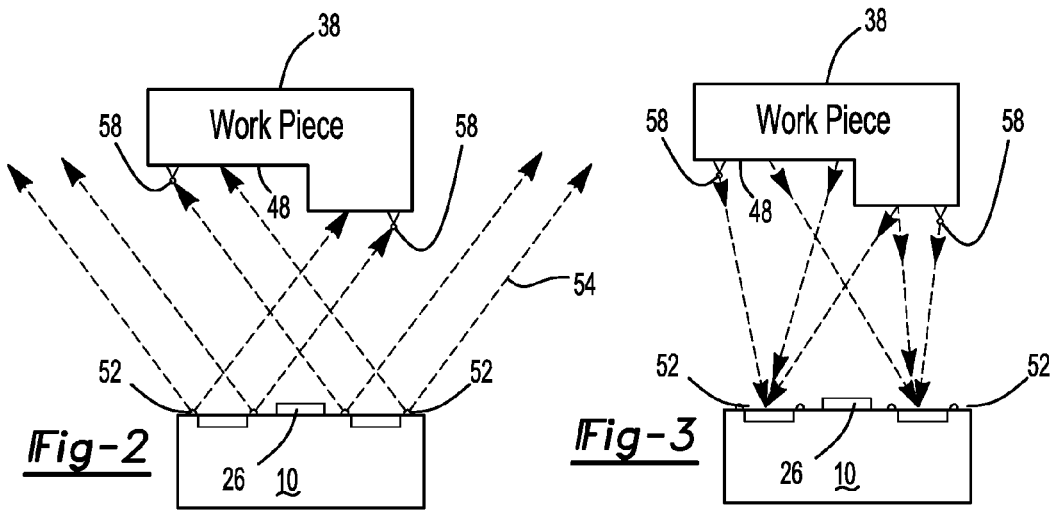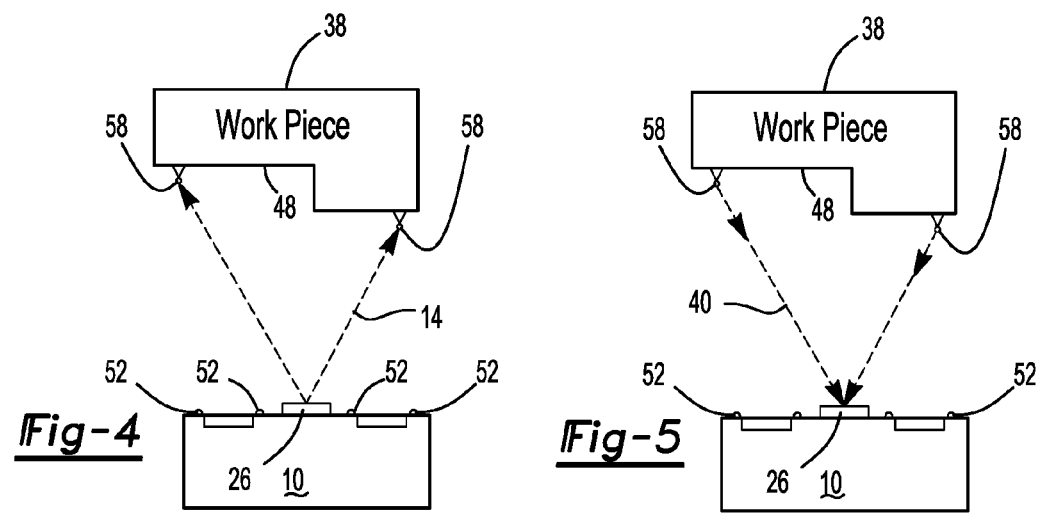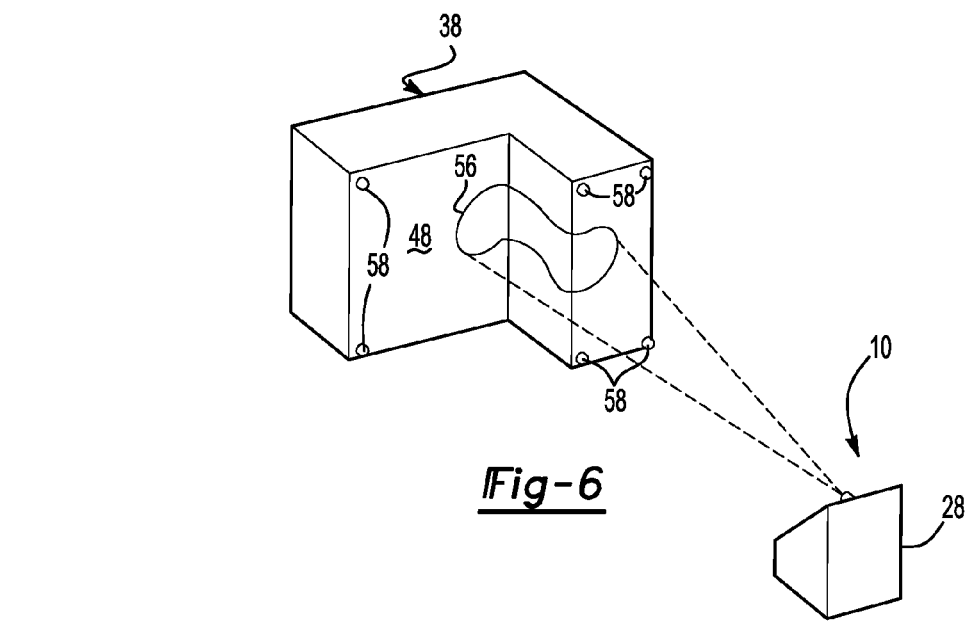

LASER PROJECTOR WITH FLASH ALIGNMENT

PRIOR APPLICATIONS

The present application is a continuation application claiming priority to U.S. patent application Ser. No. 15/784,387 filed on Oct. 16, 2017 and to U.S. patent application Ser. No. 15/784,720 filed on Oct. 16, 2017, both of which claim priority to U.S. Provisional Patent Application No. 62/408,944 filed on Oct. 17, 2016, the contents each of which are included herein by reference.

TECHNICAL FEILD

The present invention relates generally toward an improved method for projecting laser templates. More specifically, the present invention relates toward an improved method of aligning a laser projector with a three-dimensional work surface onto which a laser template is projected.

BACKGROUND

Ever increasing manufacturing tolerances have required improvements in manufacturing techniques. One such improvement is the projection of laser templates onto a work surface for directing a manufacturing process. This technique has allowed for manufacturing products at tolerances not previously achievable. However, restrictions to existing technology have limited a broader use of laser-projected images in industrial applications. For example, projecting a template onto a three-dimensional surface has proven difficult due to the inability to rapidly identify the three-dimensional work surface and to focus the laser beam onto the three-dimensional work surface in a precise manner, all while operating in a manufacturing environment.

Accurate projection of a template pattern onto a three dimensional work surface requires precise calibration of the relative position between the work surface and the laser projector. Initially, this has been achieved by locating reflective targets on the work surface, measuring the target coordinates relative to a three-dimensional coordinate system of the work surface, and then locating the position of the projector relative to the work surface using a process of calculating the position of the projector where known laser projections to the targets pass through known three-dimensional target coordinates. Periodically, the template scanning sequence is stopped and a target is located to check for variation in the projected pattern location due to a change in the position of the projector relative to the tool, or to compensate for other factors such as drift due to temperature variations in the environment, for example. When variation is detected, the targets are relocated, a new template scanning sequence is calculated, and is again transmitted by the laser projector.

The time associated with scanning target positions using a conventional laser projector has proven to be slow and inefficient. As a result, evaluating projection drift has only been performed intermittently and correction of the projected patterns has resulted in noticeable interruptions of the visible pattern template.

Therefore, it would be desirable to develop a more efficient method of locating a three-dimensional work surface relative to a laser projector to improve precision and quality of a laser template projection.

SUMMARY

A method for aligning a laser projector for projecting a laser image onto a work surface is disclosed. A laser projector assembly is provided with a laser source for projecting the laser image onto the work surface. A secondary light source illuminates the work surface and a photogrammetry device generates an image of the work surface. Reflective targets are affixed to the work surface. Light transmitted from the secondary light source toward the work surface is reflected toward the photogrammetry device for determining a location of the work surface in a three-dimensional coordinate system. After determining a location of the work surface in the three-dimensional coordinate system, the targets are scanned with a laser beam generated by the laser source for reflecting the laser beam toward a laser sensor. The laser sensor signals a processor that calculates a location for projecting the laser image onto the work surface from the reflected laser beam.

The combination of a secondary light source flashing light toward the work surface with a work piece and a laser reflective targets attached to the work piece both enhances the ability to rapidly identify an accurate location for scanning a laser template on the work surface. This method improves the quality of the laser template by significantly reducing the amount of time required to relocate the work surface in the event of drift or dynamic movement. Furthermore, the photogrammetry device signals the processor a general location of the targets attached to the work piece while simultaneously identifying a three-dimensional configuration of the work surface. This step eliminated the need for the laser scanner to independently locate the targets further reducing alignment time.

BRIEF DESCRIPTION OF THE DRAWINGS

Other advantages of the present invention will be readily appreciated, as the same becomes better understood by reference to the following detailed description when considered in connection with the accompanying drawings, wherein:

FIG. 2 shows a secondary light source transmitting light toward a work piece;

FIG. 3 shows light from the secondary light source being reflected to a photogrammetry assembly of a laser projector;

FIG. 4 shows a laser beam projected by a laser projector toward reflective targets attached to the work piece;

FIG. 5 shows the laser beam being reflected from the reflective targets attached to the work piece toward the laser projector; and FIG. 6 shows a perspective view of the workpiece having a laser template projected from the laser projector assembly.

DETAILED DESCRIPTION

Figure 1:
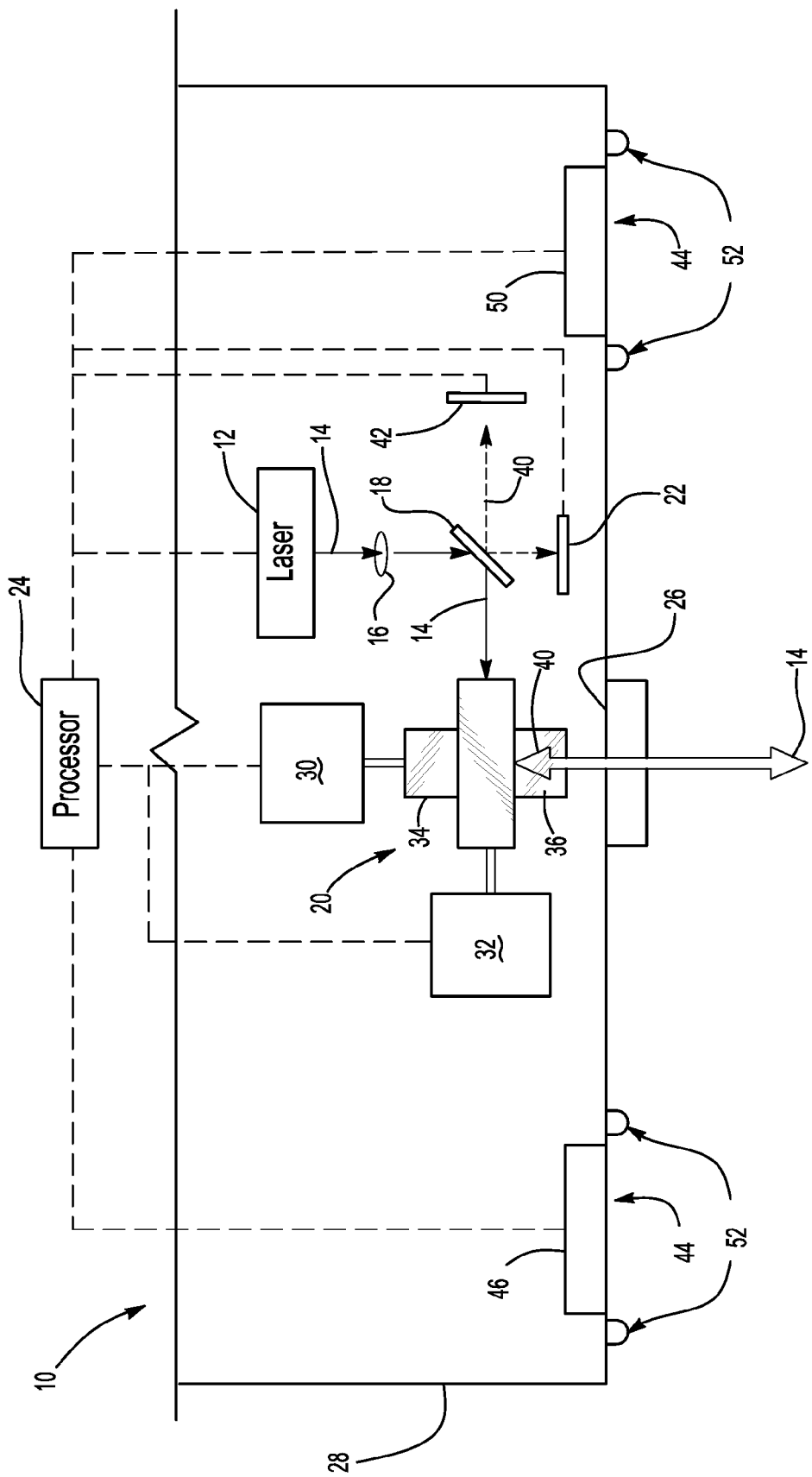
FIG. 1 shows a schematic view of relevant portions of the laser projector of the present invention.

A schematic of a laser projector assembly used to practice the method of the present invention is generally shown at 10 of FIG. 1. The assembly 10 includes a laser source 12 that generates a laser beam 14 in a known manner. The laser beam 14 is projected through a focusing lens 16 toward a beam splitter 18. The beam splitter 18 redirects the laser beam 14 toward a galvanometer assembly 20. The beam splitter 18 allows a portion of the laser beam 14 to pass through to a light sensor 22.

The light sensor 22 provides for reliable power output control by way of closed loop processing. As such, light sensor 22 is connected through an analog circuit for generating a power control loop to a processor 24. The processor directs necessary power adjustments to the laser source 12 based upon input from the light sensor 22 to maintain desired laser image resolution while processing. In this manner, the beam splitter 18 directs the laser beam 14 toward the galvanometer assembly 20 having a desirable laser power.

The galvo assembly 20 includes a first galvo motor 30 and a second galvo motor 32. The first galvo motor 30 provides pivotal movement to a first galvo mirror 34 and the second galvo motor 32 provides pivotal movement to a second galvo mirror 36. It should be understood that while two galvo motors 30, 32 are described in this application, additional galvo motors and mirror assemblies are within the scope of this invention so that three, four or more galvo motors and mirror pairs may be included with the galvo assembly 20.

The first galvo mirror 34 and the second galvo mirror 36 redirect the laser beam 14 through the output aperture 26 toward a work piece 38 (FIGS. 1-4) as will be explained further herein below. The first galvo motor 30 and the second galvo motor 32 are electronically connected with the processor 24 so that the processor 24 can continuously calculate the orientation of the first galvo mirror 34 and the second galvo mirror 36 for identifying a direction that the laser beam 14 is projected through the output aperture 26.

The first galvo mirror 34 and the second galvo mirror 36 redirect a reflected laser beam 40 through the beam splitter 18 onto a reflected laser sensor 42. The reflected laser sensor 42 is also electronically connected to the processor 24 so that the processor 24 calculates an orientation of the first galvo mirror 34 and the second galvo mirror 36 at which time the reflected laser beam 40 contacts the reflected laser sensor 42. In this manner, the processor 24 determines a direction at which the reflected laser beam 40 originates, as will be explained further herein below.

A photogrammetry assembly 44 includes a first camera 46 for generating an image of a work surface 48 of the work piece 38. The first camera 46 is electronically connected to the processor 24 for transmitting an image of the work piece 38. In an alternative embodiment, a second camera 50 is also electronically connected to the processor 24 for generating a stereo image of the work surface 48. In this embodiment, the first camera 46 and the second camera 50 are enclosed within the assembly housing 28 so that the complete laser assembly 10 is self-contained as a single module. However, it should be understood that the photogrammetry assembly 44, whether there be one camera 46 or two cameras 46, 50 need not be affixed within the assembly housing 28, but may be located separately. However, it is desirable that the photogrammetry assembly 44 be disposed in a known location relative to the laser projector 28.

A secondary light source 52 to the laser source 12 provides secondary illumination 54 to the work piece 38 and the work surface 48. In one embodiment, the secondary light source 52 is an LED strobe array located proximate each of the first camera 46 and a second camera 50. However, it is not critical that the secondary light source 52 be located proximate either of the cameras 46, 50. Further, locating the cameras 46, 50 on a rigid frame 56 relative to the galvanometer assembly 20 reduces the need to accurately identify the relative location between the cameras 46, 50 and the laser assembly 10 though other methods as is disclosed in U.S. Pat. No. 9,200,899, the contents of which are incorporated herein by reference. However, these methods may also be incorporated into method of alignment of the present application for additional dimensional verification, if desired.

Referring to FIGS. 2-5, the method of accurately projecting the laser template 56 onto the work surface 48 will now be explained. Reflective targets 58 are affixed to the work surface 48 of the work piece 38. In one embodiment, the targets 58 are affixed to a relevant datum of a three-dimensional work surface 48 so that three-dimensional features of the work surface 58 may be precisely calculated from a location of the target 58. A plurality of targets 58 may be attached to the work surface 48 at spaced locations. In one embodiment, four targets provide enough reflective information to accurately calculate three-dimensional contours of the work surface 48. More or less targets 58 may be selected based upon a particular application.

At the beginning of an alignment cycle, the secondary light source 52 transmits the secondary light 54 toward the work piece 38. The secondary light source flashes the secondary light 54 rather than projecting secondary light 54 for an extended period of time. The photogrammetry assembly 44 receives the secondary light 54 reflected from the work surface 48 of the work piece 38 and from also reflected from the targets 58. Locating the targets 58 in a known position relative to the work surface 48, such as, for example, on datum, allows the photogrammetry assembly 44 to use the target 58 configuration to locate the three dimensional configuration of the workpiece 38 for ultimately determining a location of the three-dimensional surface 48 in a three-dimensional coordinate system. In this manner, the photogrammetry assembly 44 signals the processor 24 to calculate changes in contour defining the three-dimensional work surface 48.

As set forth above, the photogrammetry assembly 44 also detects the secondary light 54 reflected from the targets 58. The processor 24 also determines a general location of the targets 58 in the three-dimensional coordinate system when signaled by the photogrammetry assembly 44. Based upon the target 58 coordinates from the secondary light 54, the galvo motors 30, 32 orient the laser beam 14 generated by the laser source 12 to directly scan the targets 58 with the laser beam 14. As such, the processor 24 recognizes a target 54 pattern and calculates the required location to scan the targets 58 with the laser beam 14 for calculating an accurate location of the laser template 56 on the work surface 48.

Once target 58 coordinates are calculated, the laser beam 14 is projected by the laser source 12 onto the targets 58 as shown in FIG. 4. FIG. 5 shows the laser beam 14 being reflected from the targets 58 back toward the projector assembly 10 through the output opening 26. By way of retro reflection, the return laser beam 40 is redirected by the first galvo mirror 34 and the second galvo mirror 36 through the beam splitter 18 onto the reflected laser sensor 42. At which time, the reflected laser sensor 42 receives the reflected laser beam 40, the first galvo motor 30 and the second galvo motor 32 signal the processor a location from which the return laser beam 40 originates. Using the galvo motor 30, 32 orientation, the processor 24 calculates an exact location of the targets 58, and therefore, is capable of accurately projecting the laser template 56 as shown in FIG. 6.

Each camera 46, 50 comprises a CMOS sensor, or in the alternative, a CCD sensor depending on the needs of a specific application. The sensors in one embodiment comprise a multi megapixel sensor that is electronically connection to the processor 24. In one embodiment, a five megapixel sensor provides sufficient image quality. Each camera 46, 50 whether used singularly or in stereo, include a view angle of between about 60 degrees and 80 degrees to provide a wide optical field of view. However, alternative view angles may be desirable depending upon a size of the work piece 38 or distance between the assembly 10 and the work piece 38. More specifically, the field of view is contemplated to be 75 degrees in a horizontal direction and less in a vertical direction. It is further within the scope of this invention that the laser beam 14 and the secondary light 54 include a same or similar wave length. However, in alternative embodiments, the laser beam 14 and the secondary light 54 may include different wave lengths. For example, it is further contemplated that the secondary light 54 may be infrared or other non-visible light detectable only by the photogrammetry assembly 44.

The projector assembly 10 of the present invention is also capable of identifying dynamic motion or movement between the work piece 38 and the assembly 10 as is disclosed in co-pending U.S. Patent Application No. 61/757,412, the contents of which are included herein by reference. However, intermittent flashes by the secondary light source 52 provide for monitoring the location of the targets 58 and the work surface 48 enables the assembly to identify drift of either the work piece 38, the assembly 10, or even the laser beam 14. Once drift is detected, the processor 24 reinitiates the sequence of identifying a location of the work surface relative to the laser projector 10.

The invention has been described in an illustrative manner, and it is to be understood that the terminology has been used as intended to be in the nature of words of description rather than of limitation. Obviously, many modifications and variations of the present invention are possible in light of the above teachings. It is, therefore, to be understood that within the specification, the reference numerals are merely for convenience, and are not to be in any way limiting, as the invention may be practiced otherwise than what is specifically described.

What is claimed is:

1. A method for aligning a laser projector for projecting a laser image onto a work surface, comprising the steps of:
providing a laser projector assembly with a laser source for projecting a laser image onto a work surface, a secondary light source for illuminating the work surface, a photogrammetry device for generating an image of the work surface, and a laser sensor for sensing a laser beam;
affixing reflective targets onto the work surface;
transmitting light from the secondary light source toward the work surface and reflecting light toward the photogrammetry device from the reflective targets thereby identifying a pattern of the reflective targets on the work surface in a three dimensional coordinate system; and
after identifying the pattern of the reflective targets on the work surface in the three dimensional coordinate system, scanning the targets with a laser beam generated by the laser source as directed by the identified pattern of the reflective targets for reflecting the laser beam toward the laser sensor and calculating a precise location of the targets from the reflected laser beam for directing the laser projector where to project the laser image onto the work surface.

2. The method set forth in claim 1, wherein said step of providing a photogrammetry device is further defined by providing stereo cameras for determining the location of the targets by triangulation.

3. The method set forth in claim 1, wherein said step of determining a location of the targets in the three dimensional coordinate system with the photogrammetry device is further defined providing a processor being interconnected with a multi megapixel sensor.

4. The method set forth in claim 2, further including the step of the stereo cameras each providing a view angle between about sixty and eighty degree optical field of view.

5. The method set forth in claim 1 wherein said step of transmitting light from the secondary light source is further defined by transmitting intermittent light flashes from the secondary light source.

6. The method set forth in claim 1, further including the step of the laser source and the secondary light source transmitting light at a same wavelength.

7. The method in claim 1, further including the step of providing a light sensor for detecting the laser beam reflected from the targets toward the laser projector thereby identifying the location of the targets.

8. The method set forth in claim 1, further including the step of the photogrammetry assembly detecting the position of the workspace and pattern of the targets attached to the work surface for directing the laser beam toward individual targets relying on a fixed position of the photogrammetry assembly relative to the laser projector assembly.

9. The method set forth in claim 1, further including measuring drift of the work surface from a first position from light from the secondary light source reflected from the targets toward the photogrammetry assembly.

10. The method set forth in claim 1, further including the step of reflecting light from the secondary light source from the targets to the photogrammetry assembly for determining a position of the work surface.

11. The method set forth in claim 1, wherein said step of providing a photogrammetry assembly is further defined by providing a single camera for generating an image of the work surface.

12. The method set forth in claim 1, wherein the step of identifying a pattern of the targets is further defined by identifying a general location of the targets on the work surface.

13. The method set forth in claim 1, wherein the step of affixing reflective targets onto the work surface is further defined by affixing reflective targets onto the work surface at known positions relative to the work surface.

* * * * *

(12) INTER PARTES REVIEW CERTIFICATE (3738th)

United States Patent
Rueb

(10) Number: US 10,052,734 K1
(45) Certificate Issued: Sep. 30, 2024

(54) LASER PROJECTOR WITH FLASH ALIGNMENT

(71) Applicant: Kurt D. Rueb

(72) Inventor: Kurt D. Rueb

(73) Assignee: VIRTEK VISION INTERNATIONAL ULC

Trial Number:

IPR2021-00062 filed Oct. 14, 2020

Inter Partes Review Certificate for:

Patent No.: 10,052,734
Issued: Aug. 21, 2018
Appl. No.: 15/826,060
Filed: Nov. 29, 2017

The results of IPR2021-00062 are reflected in this inter partes review certificate under 35 U.S.C. 318(b).

INTER PARTES REVIEW CERTIFICATE
U.S. Patent 10,052,734 K1
Trial No. IPR2021-00062
Certificate Issued Sep. 30, 2024

AS A RESULT OF THE INTER PARTES REVIEW PROCEEDING, IT HAS BEEN DETERMINED THAT:

Claims 1-13 are found patentable.

* * * * *